Figure 1:
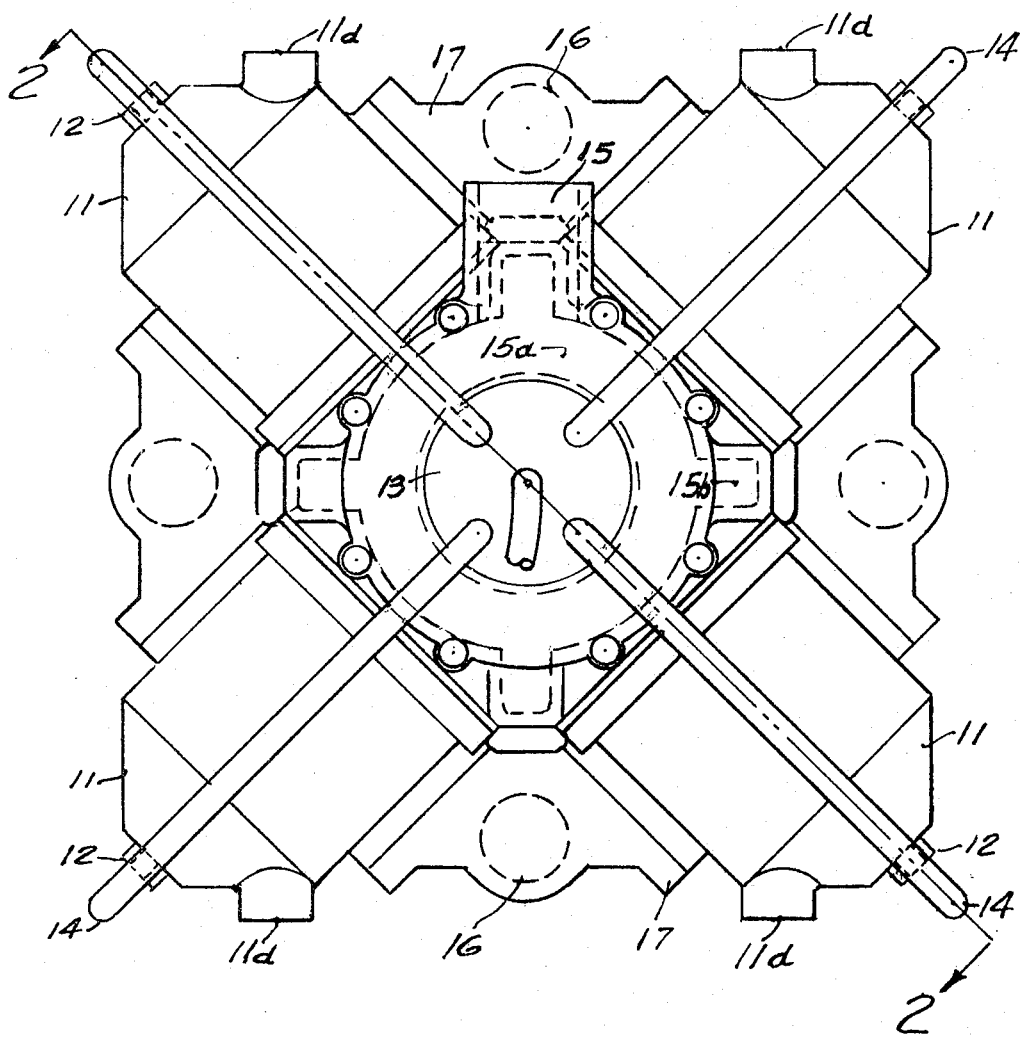

INVENTOR.
John L. Hittell.

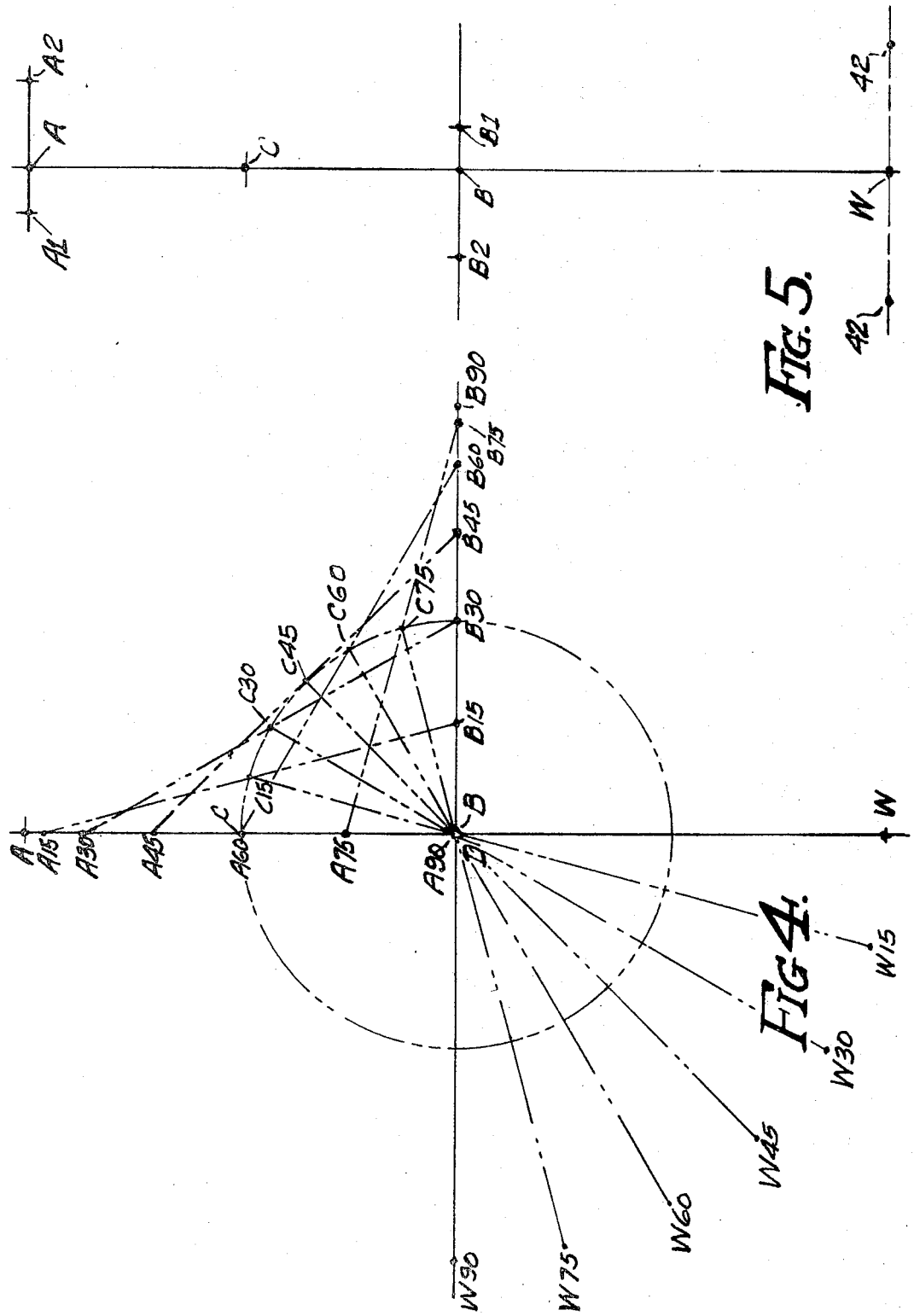

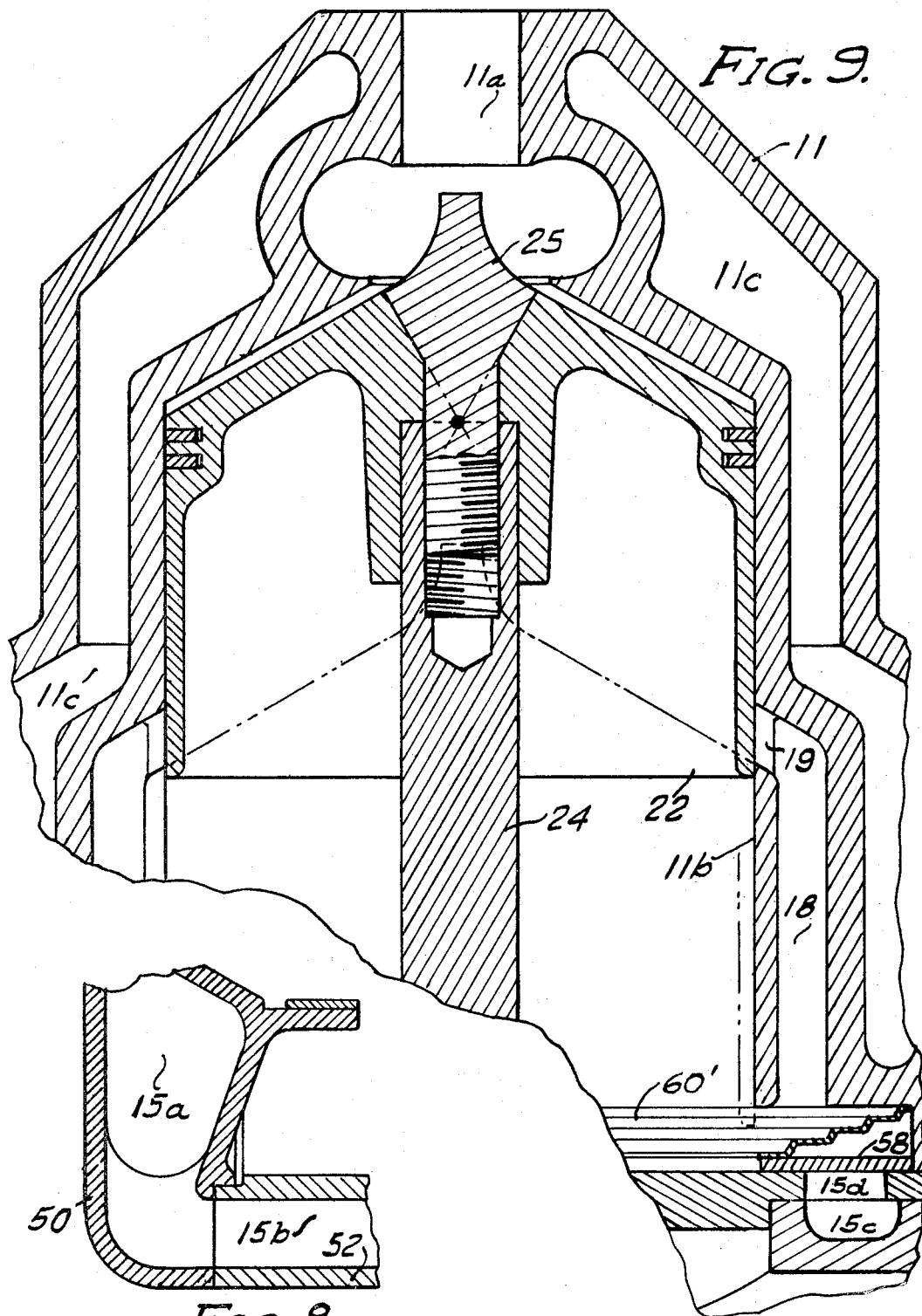

Patent 3,311,095 — Reciprocating Piston Engines 3,311,095
RECIPROCATING PISTON ENGINES
John L. Hittell, Livonia, Mich.
(305 Linnwood Drive, Biloxi, Miss. 39531)
Original application Feb. 15, 1963, Ser. No. 260,607, now Patent No. 3,258,992, dated July 5, 1966. Divided and this application Sept. 20, 1965, Ser. No. 498,185
1 Claim. (Cl. 123—74)

This invention concerns reciprocating piston engines, including novel features particularly for use in internal combustion engines. This application is a division of copending application Ser. No. 260,607 filed Feb. 15, 1963, which issued on July 5, 1966, as Patent No. 3,258,992. This application shows features claimed in the said patent in addition to the features claimed herein.

In the present state of the art, all reciprocating piston engines vibrate to some degree, becoming much less noticeable with increase in number of cylinders employed. However even with eight or more cylinders the vibration is still objectionable and makes it necessary to use vibration absorbing mountings to reduce transmission of vibration to adjoining structures and to people in contact with them, such as the operators or passengers of motor vehicles.

In the prior art, certain means have long been known for balancing the strong second harmonic vibration which has been a prominent characteristic of four cylinder vertical engines. Known devices have employed extra shafts carrying counterweights and driven at twice crankshaft speed, involving added cost and ultimate noise and wear in the drive mechanism. They also leave some definite unbalanced higher harmonics of noticeable amplitude, so have not found wide use in spite of the millions of engines needing this type of device which have been produced.

It is recognized that various means have been known in the art whereby pure sinusoidal motions may be generated, but none of these have found very extensive use.

It is also known that certain rotary engines of the general type that is sometimes termed "epicyclic" and patented as early as Apr. 7, 1907, as well as certain significant recent developments in rotary engines of a very closely related type, can be arranged to have inherent dynamic balance. These prior devices, while theoretically of positive displacement, can only attain this result in practice when the difficult problem of adequate and durable sealing is solved. It is commonly considered among those skilled in the engine arts that it is very much easier to build and maintain durable and efficient sealing when using ordinary cylindrical type pistons and rings.

With this prior art in view, a primary object of this invention is to devise very simple engines using cylindrical reciprocating pistons arranged to inherently permit full dynamic balance at highest speeds, even as a single cylinder engine, and to accomplish this by using a fundamental motion for reciprocation which is free from harmonics and counterbalanced by completely matched means such that all masses are exactly balanced at all times and no harmonics are generated.

A second object is to provide means for constructing engines with these advantages, yet provided in a device which is naturally compact, low in cost and weight and simple to manufacture and service, to thereby attain such light weight by inherent construction rather than by close shaving and high refinement, to permit early development of satisfactory small lightweight engines for small aircraft, for light military equipment for easy long distance air transport, and for general portable use such as in outboard motors, and farm or garden tools.

A further object is to operate this engine on the two cycle system or technically the two stroke cycle, yet to completely free it of the usually expected deficiencies of two cycle engines, but to still retain one power pulse per revolution for each cylinder. Related objects are to improve the breathing means to maintain positive breathing at much higher speeds, to avoid significant amounts of lubricant mist getting into the combustion chambers to cause smoke or high oil consumption, and to provide an engine inherently free from some of the other usual atmospheric contamination effects.

Another object is to provide a combustion chamber rearrangement to insure more rapid flame-propagated combustion, more easily controlled to be virtually completed very near top center, yet avoiding too sudden combustion such as to produce knock. It is also an object to provide as a part of such rearrangement, a piston head shape allowing reduced weight and reduced heat transfer to its upper surface and from its lower surface.

Other objects of this invention are such as may be attained by use of the features, combinations and sub-combinations herein disclosed in the various relations to which they may be adapted. While the various means and principles disclosed herein are applicable to engines of one or any other number of cylinders, there are important advantages in using pairs of opposed cylinders, and use of four cylinders at right angles allows additional advantages such as to afford superb smoothness and light weight as well as simplicity. This arrangement has therefore been selected as the preferred embodiment. The drawings omit some standard and well known accessories and equipment, and show only diagrammatic representations of some other such items. The invention may be fully understood by reference to the drawings in which like characterers represent like parts in all views.

Figure 2:
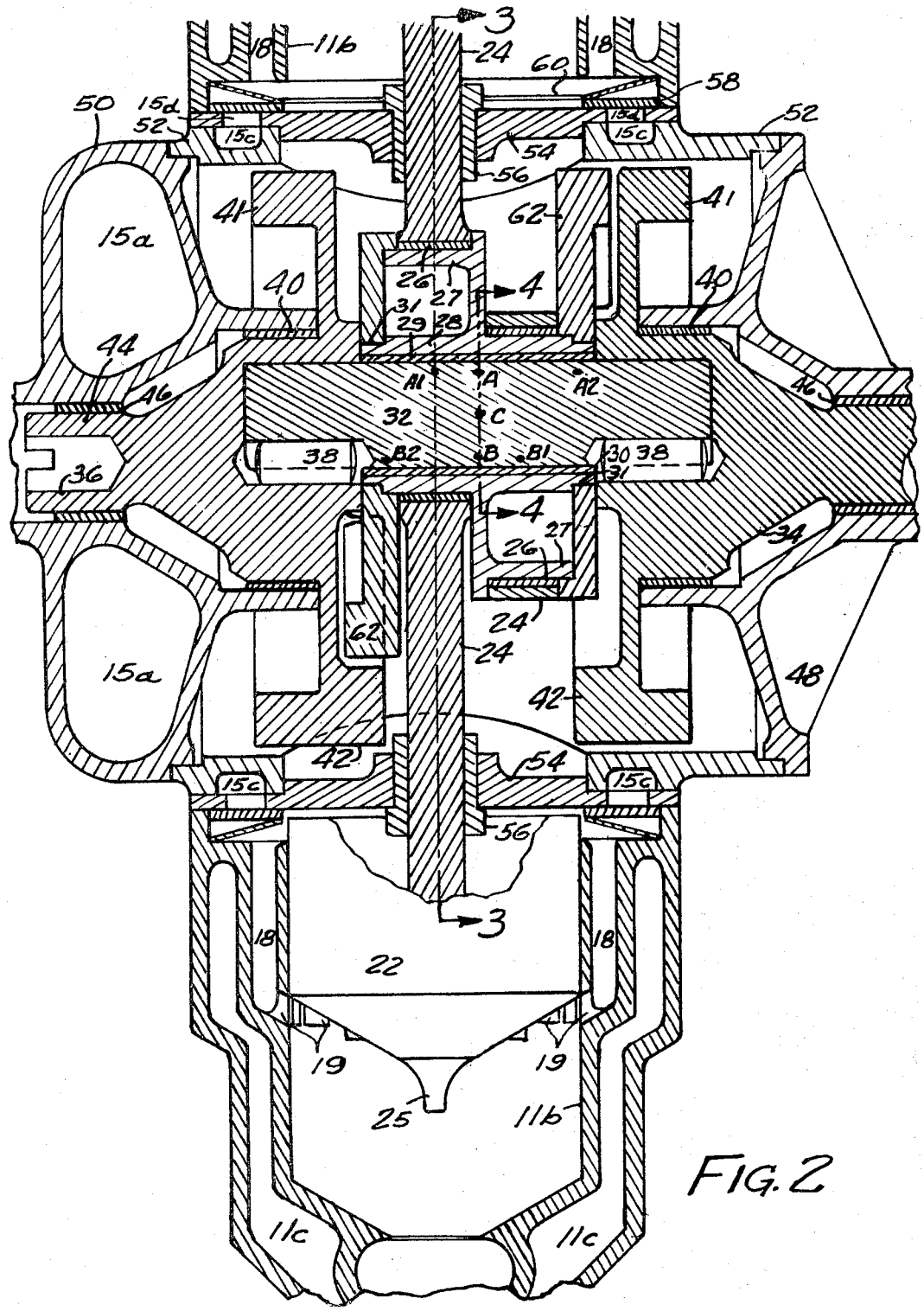
Figure 3:
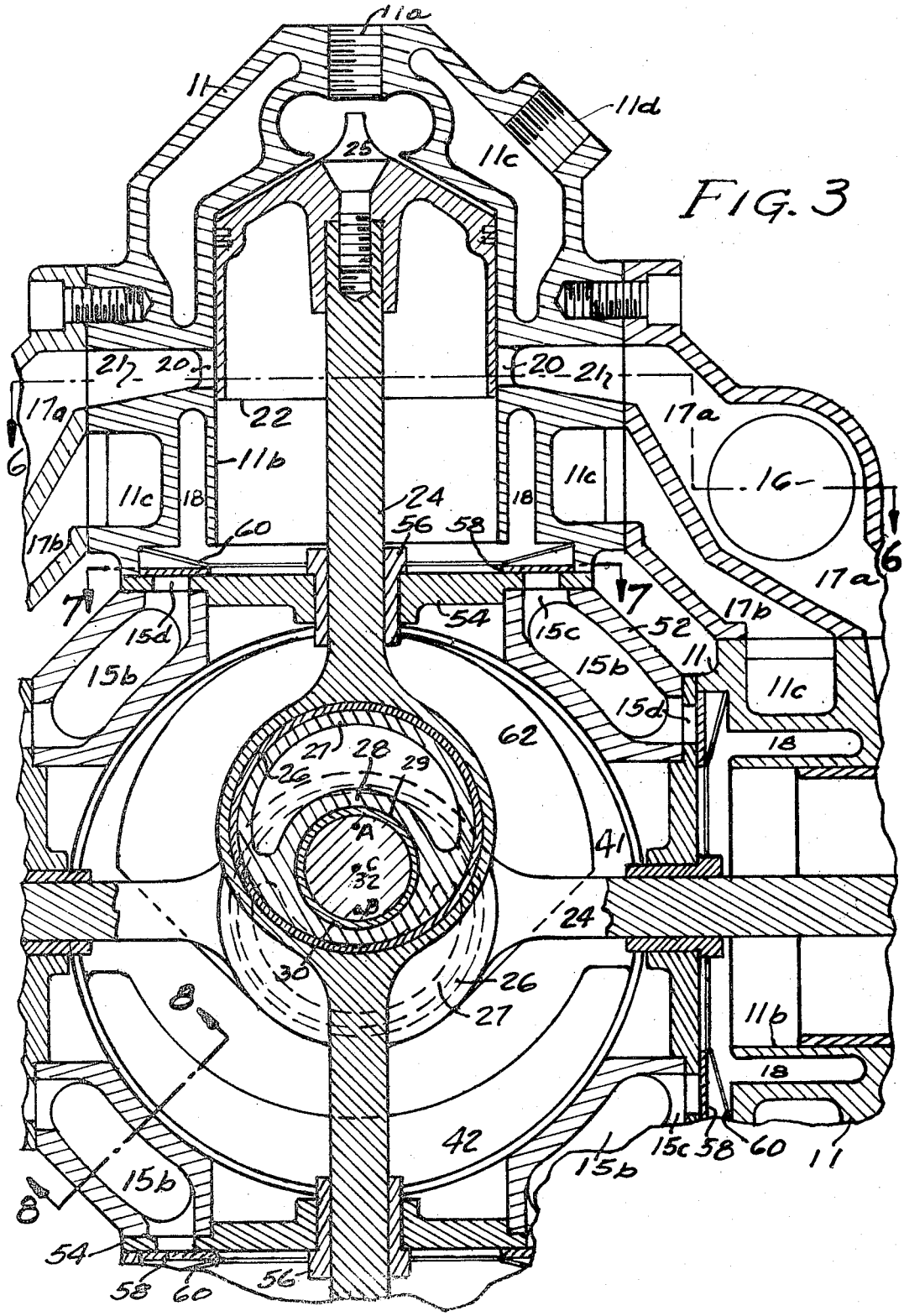
Figure 6:
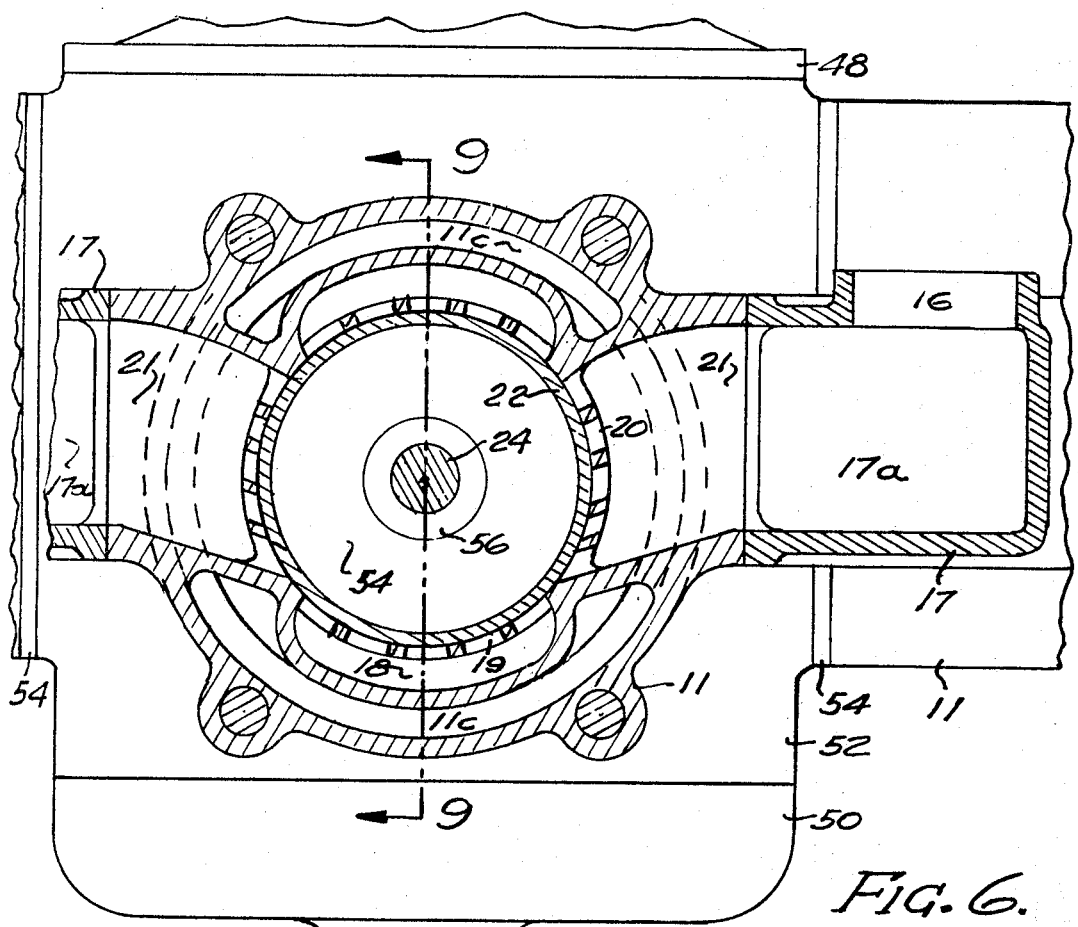
Figure 7:
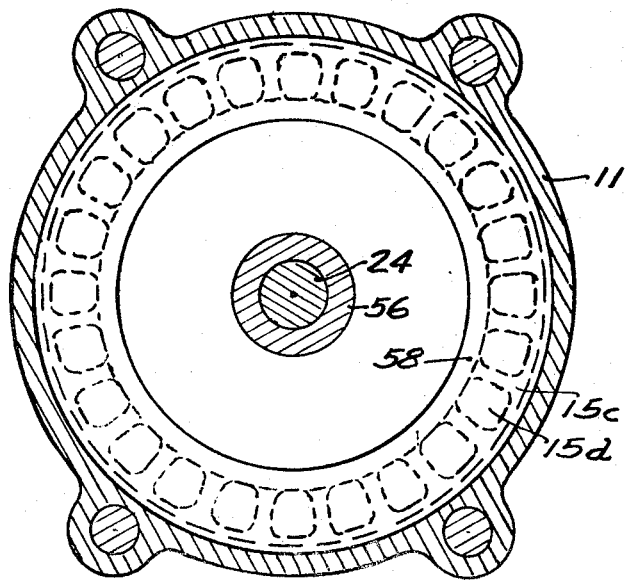

In the drawings, FIG. 1 is an end view of the four cylinder internal combustion engine of this selected embodiment and shows a characteristic X arrangement of cylinders. FIG. 2 is a partial section to a larger scale, along the line 2—2 of FIG. 1, and FIG. 3 is a cross-section in the plane of line 3—3 of FIG. 2. FIG. 4 is a further enlarged fragmentary and diagrammatic sectional view along the line 4—4 of FIG. 2, showing motion paths of elements. FIG. 5 is an enlarged diagrammatic view of the centerlines and center points of the elements of FIG. 4, projected in alignment therewith. FIGS. 6, 7 and 8 are sections along the respectively indicated lines of FIG. 3, while FIG. 9 is a section on line 9—9 of FIG. 6 drawn to a larger scale.

In FIG. 3, one of the cylinders is seen in a vertical position, and in reference herein to cylinders and related parts, words are generally used in the usual sense of vertical cylinders, even though other views show or indicate some other orientation, and the cylinders may be turned in any convenient direction in the use of the engine.

FIG. 1 shows four cylinders 11, arranged at right angles and provided with sockets 11a to receive a known kind of combustion intiator 12 which may be of either the spark plug or the fuel injection nozzle type. A timing and distributor unit, also of known construction, whether of the spark ignition or fuel injection type, is diagrammatically shown at 13, and is connected to the initiators by lines 14. Controlled by methods well known in these timing and distributing devices, timed start of combustion is caused to occur in each cylinder in sequence in the direction of shaft rotation, here defined as clockwise in FIGS. 1, 3 and 4.

The working fluid may be air or the more usual air-fuel mixture, entering the engine through an inlet passage 15, which is in free communication with an annular passage 15a, also communicating at four places with corner passages 15b and with ports 15c and apertures 15d as may be seen on FIGS. 3 and 8.

The exhaust takes places through four passages 16, in the four elbows 17. The passages 16 each join two exhaust passages 17a, each elbow providing one passage for each of the cylinders. Each cylinder has a jacket-type inlet passage 18, seen outside the inner cylinder wall in FIGS. 2 and 3. A plurality of inlet ports 19 communicate directly with the passages 18, as may be seen in FIG. 6, which also shows a plurality of exhaust ports 20 communicating through ports 21 with passages 17a. The ports 19 and 20 communicate directly with the cylinder working chambers within the cylinder bores 11b in which the pistons 22 operate. Two piston rods 24 are employed. Each rod has two straight end-portions to which the pistons are attached by means of self-locking screws 25, four pistons being thereby mounted on the two rods 24. This is the preferred construction, but one piston per rod may be used and might be better in some cases. Between the two end-portions each rod has an eye-portion with a bushing 26 fitted therein. Each of the two bushings 26 has journalled for rotation within it, one of two eccentric diameter portions 27, of a compound eccentric member 28. These two eccentric diameter portions are on centers diametrically opposite with respect to, and equally spaced from, the center of a bore 29 passing through the center of the member 28. This bore is fitted with a bushing 30 in which is journalled a crankpin 32.

Two shafts 34 and 36 are alike in most respects; each is shaped to closely fit one end of the crankpin 32 and one of two round-pin keys 38, and is journalled in one of a pair of aligned bushings 40. The shafts 34 and 36 are also alike in that they each have integral flywheel portions 41 and counterweight portions 42, and both are tapered to smaller diameters having bearing portions 44 which are journalled in bushings 46. They differ in that shaft 34 is on the power end of the engine and its outside end may be coupled to other equipment in any desired manner, while the shaft 36 has an extending end with an offset cross-keyway and pilot forming a drive for the distributor unit.

The bushings 40 and 46 are supported in an end cover 48 on the power end, and in a cover and inlet manifold 50 on the opposite end containing the inlet passage 15 (FIG. 1) and the annular connecting passage 15a. A crankcase frame 52 has affixed thereto the end cover 48, the cover and inlet manifold 50 and the four cylinders 11. Clamped between the cylinders and the crankcase frame are four diaphrams 54, each of which carries a bushing 56 to guide seal an support one of the straight end-portions of the piston rods. Four washer-shaped inlet check valves 58 seat on the diaphragms 54. The series of apertures 15d are covered and sealed by these valves as seen in FIG. 3. The lift of the valve is limited by the depth of the valve space provided in the base of each cylinder of this purpose. The valves are seated by thin springs 60, which are of the conically formed annular disc type or by conical spring with annular corrugations 60'. Each spring seats at its periphery against the shoulder on the cylinder 11 at the top of the valve space, and its inner edge bears against the valve 58 to seat the valve before backflow occurs. This type of spring whether plain conical (FIG. 2), or with annular waves or stepped section (FIGURE 9) allows completely clear inward flow around the full inner diameter of the valve for free inlet from the apertures 15d to the space under the piston when the valve is lifted, and when the valve is seated, an equal area is clear all around the inner diameter of the valve and open for free flow above the spring from under the piston to the inlet passages 18.

Counterweight flywheels 62 are mounted with their counterweight portions diametrically across the axis of the crankpin 32. They are each firmly held in this relation by pilot diameters on spaced center distances. Each has a small pilot diameter 31 concentric with the crankpin 32, within a larger pilot diameter fitting one of the eccentric diameter portions 27 of the eccentric member 28. Since the center distance between these diameters is the same on each end of the eccentric member, the counterweighted flywheels are made alike and turned to the positions shown before assembly.

While the cylinders do not appear to be alike in FIG. 1, they are of identical design and merely rotated one half turn around the cylinder axis in each alternate position. These half turns allow the slightly offset cylinder exhaust ports to meet the elbows 17 in a mid-position as seen in FIG. 6, while permitting the cylinders to be offset along the engine axis a short distance allowing the piston rods and bushings 26 to be positioned as shown in FIG. 2. Each elbow has a coolant passage 17b to allow interchange of coolant between cylinders where these passages join the coolant jacket spaces 11c. Ports for inlet and outlet of coolant are at 11d. The like pitson rods 24 appear different in FIG. 2, because they are at different angles, as is shown in FIG. 3.

The screws 25 each have a conical seat under the head, and the apex of the cone is made to intersect at the flat piston seat on the end of the piston rod 24. This prevents loosening or tightening of the mating surfaces by temperature changes, so retains the initial set-up pressure on the piston even though there may be great differences in expansion or contraction between the screw and the piston, as either may expand or contract independently along the cone angle or the flat seat without any effect on the tightness, since the intersection of the apex of the cone and the flat seating face acts as the origin from which any thermal change of dimension occurs. In addition to these provisions for maintaining initial tightness, the screw threads are preferably one of the known varieties of self locking threads now used for connecting rod nuts and bolts on many high production engines. The head of this screw is shaped to form a portion of the walls bounding a toroidally shaped combustion cavity, but slightly modified to have a short substantially straight portion shaped to accept a driving chuck for installation or removal.

The primary object of the toroidal cavity is to provide a site for a toroidal swirling motion. There are two factors that cooperate to set up this motion. First, after the exhaust has been partly completed, the ports 19 are uncovered by further piston travel, allowing slightly compressed air or mixture to flow through the passages 18 from under the piston. Under a pressure of approximately 19 to 26 p.s.i.a. (which may be varied by proportions) it flows with considerable velocity along the top of the piston from both sides, and these flow over the upward slope meet and merge into a single upward flow above the center of the piston. This starts a roughly toroidal swirling motion in the entire space above the piston, including a downward flow sweeping the cylinder-head slope and side walls which aids the completion of scavenging. Then, during the upstroke of the piston which follows, the charge is gradually forced into the toroidal cavity in the cylinder head, so progressively less charge takes part in the downward motion. As the piston nears its top position down flow at the cylinder wall ceases and is superseded by the squish flow, which takes place in an inward direction. The flow immediately above the piston thus continues in an inward direction with the squish velocity adding to the initial swirl velocity as a second factor to create a more rapid swirl in the initial direction, but now concentrated in the toroidal cavity in the cylinder head. This gives significant advantage in having the cavity in the cylinder head instead of the piston, where squish flow would create a toroidal swirl in the reverse direction, counteracting rather than amplifying the initial swirl caused by the inlet flow.

Placing the main part of the toroidal cavity in the cylinder head instead of the piston also causes considerably less heat to be transferred from the combustion chamber to the piston. High combustion temperature and surface velocity in the toroidal cavity cause the rate of heat transfer to be much higher on the cavity surface than elsewhere. In the cylinder head the heat can be easily carried away, but in the piston it is much less easily removed and generally more harmful in its effects. In the construction herein provided, over three-fourths of this high heat transfer area is in the head, significantly reducing heat to the piston. In this engine, wherein the inlet is taken under the piston and exposed to the heating effect of the bottom surface of the piston before being transferred to the working chamber, this reduced heat to the piston has doubled effect in permitting cooler compression strokes, using less power. A unique conical piston-head is also provided, gaining the well known strength and rigidity in relation to weight which is inherent in this shape, so allowing elimination of the usual under head ribbing, to further reduce the heat transfer from the under-piston surfaces to the inlet charge.

The rapid toroidal swirl reaches its highest rate slightly before top center, so that at the time of ignition, whether by spark or by the action of highly compressed air on fuel droplets, the swirl rate is near its maximum. The tip of the screw 25 is at the highest temperature of any wall of the combustion chamber, since it is in a location receiving heat at a maximum rate both by radiation and convection, and is also most remote from the conductive cooling which is effective for other surfaces. This tip thus forms a hot spot of small area and a relatively high temperature.

In arranging this device for compression ignition, the material for this screw may best be one that is highly resistant to oxidation at high temperatures, and one of low thermal conductivity, and the proportions may be such that this spot is hot enough to accelerate pre-flame reactions in nearby fuel droplets and to assist the other available heat in creating full combustion after pre-flame reactions. In its central location all the outer surface of the cavity content passes very close to this hot spot each swirl revolution. The swirl motion is upward around the hot spot, while the fuel spray is downward, so the swirl air and fuel droplets impinge in maximum intimacy of contact, strongly accelerating pre-flame reactions and fuel evaporation and mixing. The air has sixteen or more times the weight of the fuel, so air swirl is not materially reduced, but many of the fuel droplets become relatively stationary to highly accelerate pre-flame reactions and full inflamation by sustained close proximity to the hot spot. After start of flame, one revolution of air swirl brings the entire surface of the toroid content very close to the hot spot to materially assist rapid flame propagation.

For spark ignition, the compression and other proportions are altered to attain cooler conditions throughout the combustion chamber. The spark plug is centrally located where the toroidal cavity surrounds the electrodes, and the entire surface of the toroid content must pass very close to the spark every swirl revolution, so if the decay of the spark is controlled to maintain good spark for one or two swirl revolutions, the entire outer surface of the cavity content is by then inflamed so that very short flame travel assures combustion of all the content. The small portion of the charge in the squish clearance is as usual the last to be ignited. In the development of this device for spark ignition, the annular core of the toroidal chamber should be kept cool enough to prevent self ignition. This coolness is facilitated by the fact that over three-fourths of the surface of the toroid is in contact with well cooled walls of the cylinder head.

The forced transfer of the under-piston air or mixture to the working chamber above the piston has been described in connection with the creation of the initial swirl. Another highly beneficial effect gained by this arrangement is gathering of all blow-by gases and returning them to the combustion chamber for reigniting of any incompletely combusted fuel before it is exhausted, thus avoiding an important source of noxious atmospheric contamination. Filling of this under-piston space occurs as each upstroke of the piston causes pressure difference to lift the valve 58 against the force of the spring 60, which is proportioned to allow lift under very slight pressure difference. The total weight of the valve and spring is kept so small that even at highest speeds full lift is achieved by very rapid start of lift, even under very small pressure difference. Thereby the under-piston space is filled to very nearly atmospheric pressure, or normally 12 to 14 p.s.i.a. at the time the valve seats, after the upstroke of the piston is finished. During its down stroke with the valve seated a light compression occurs until the ports 19 are uncovered as the piston nears bottom position and the forced transfer follows.

In the under piston region, the contact of the piston and ring with the cylinder wall needs only slight lubrication. The bushing 56 is lubricated from its opposite end by crankcase lubrication as hereinafter described. A sufficient amount of lubricant is allowed to work through the bushing to meet the cylinder wall lubrication needs, but without excess such as to allow any significant amount to become suspended as mist. Any mist is promptly swept into the combustion chamber above the piston where the initial swirl throws the droplets outward toward the walls, and blows them outward under the cylinder head to the sidewalls for above piston lubrication. Such trace of lubricant as might still remain suspended as mist is all that is likely to be burned or carried into the exhaust.

Lubricant in the crank space is preferably kept drained into a separate container with the lubricant being drawn therefrom and supplied to the mechanism under pressure by a separate pump in a manner well known in other drained crankcase or so-called dry sump systems. The crank space is isolated from the four corner passages 15b, by walls as seen in FIG. 3 and from the under-piston spaces by the diaphragms 54 and the bushings 56, so most of the lubricant is confined to the crank space, a little working through the bushings 56 as has been explained.

No fuel is mixed with the lubricant, and none of the fuel or combustion air passes through the crank space, so very little oil is carried into the combustion chambers and oil consumption and smoke are minimized. The flame propagated combustion insures good operation at high compression ratio so provides good fuel economy. The forced induction is a material aid to easy starting, and elimination of mixing oil with the fuel avoids need of draining oil to remove stale fuel after long stops.

To permit complete and perfect balance, pure sinusoidal motion, free from all harmonics, is utilized. The operation of the structure used to attain this motion, and the geometry of the motion, may be most easily explained and understood by applying letters to centerlines and center points of several of the parts. In FIG. 3 these centerlines appear as points, and the point A is on the centerline of one of the bushings 26, while the point B is on the centerline of the other bushing 26. Central between these two points is point C which is on the centerline of the crankpin 32. The positions of these points are also shown to a much larger scale in FIG. 4, and a series of additional points are also shown as A15, A30, A45, and so on, representing the positions of the point A after the crankshaft has rotated 15, 30, 45, or more degrees clockwise in 15 degree increments from the initial position as also seen in FIGS. 2 and 3. The points B and C also have their various respective positions shown in FIG. 4 at the same series of 15 degree increments of rotation, and another point D is shown at the center of the figure and represents the fixed center of the shaft assembly or crankshaft which, in this embodiment, consists of the shafts 34 and 36 carrying the counterweights 42, the crankpin 32 and the two round-pin keys 38, assembled and rotatable as a unit. The path of point C is a circle of a radius equal to the distance from the point D to the point C as seen in FIG. 4, and herein called the distance DC. This distance is made the same as the two equal distances from the point C to the points A and B which have been established and described with the elements 26 to 32.

The points A, B and C are always on a straight line and the point B is also always on the line through the points D and B90, so the equal distances from the points A and B to point C cause the point A to be exactly twice as far from this line as the point C. This holds for all positions, and the distance of point C from the line D–B90 always equals the distance DC times the cosine of alpha, where alpha is the angle through which the crankshaft has rotated from the initial position indicated. Since the distance of point A from the line D–B90 is always just twice as great as that of point C, or equal to the distance DA (from D to the initial A position) times the cosine of alpha, the motion of point A is a pure cosine motion with full geometric basic precision, so known to be free of any inherent harmonics of the fundamental motion.

While the point A has been proceeding in the described manner from A to A90, the point B has moved from D through B15 etc. to B90 along its travel path at 90 degrees to the path of point A, and its distance from D is always equal to the same distance DA times the sine of alpha. Everything is the same as for point A except that for point B the distance is determined by the sine instead of the cosine of alpha. This means that the motions are of identical character, but out of phase by 90 degrees, which is in accord with the well known fact that the sine and cosine functions of an angle are identical in manner of variation, but similarly out of phase. The motion of point B is thus also entirely free from harmonics. It should be noted that the line ACB carrying the three point pattern, and the parts 28 and 62 which are centered on these points, are all forced to rotate in a direction reverse to the rotation of the crankshaft and at a precisely equal reverse angle at all times, by the properties of the geometry existing in FIG. 4, so these parts and the three point pattern can have no rotary acceleration while the crankshaft rotates at constant speed. This freedom from rotary acceleration while the points A and B are guided on their specified lines of travel means that no side forces are applied to the guides to maintain the constant velocity rotation of the masses at the A, B and C points. The guides serve to maintain the geometry as speed and other conditions vary, but side forces at the guides occur during such changes. Linear acceleration of any masses in or attached to the piston rods applies inertia forces to points A and B, directly through these points and in line with their lines of travel, so also in line with point D. No side forces on the guides and no tendency for rotary acceleration or deceleration of the rotary masses of the mechanism are created by the sinusoidal linear motions of the masses at A and B.

Constant speed of rotation as above considered is approximately achieved during normal operation. The general purpose of flywheels is to minimize cyclic speed variation which obviously may be caused by fluid pressure forces applied to the pistons of any piston pump or engine. When a gear drive is used to couple a second shaft carrying a counterweight as a mass load, the permissible elastic compensation is very low and the forces necessary to attain the required repeated slight speed changes of the mass load must be transmitted by the drive. A reversal of force at a cyclic rate equal to the number of cylinders times the speed of rotation is a rather high frequency reversal, so forces involved are considerable, even with a small amplitude of speed variation. Gear drives tend to suffer noticeable punishment from these reversals. Any backlash initially existing allows impacts at the line contacts of the gear meshing. These regeneratively increase the punishment as backlash is increased by the impacts. Noisy operation and shortened life obviously result.

The type of drive herein disclosed avoids these conditions, partly by being commercially producible with less initial backlash, but mostly by the fact that good oil films of substantial area exist at all places where backlash might tend to originate. The large area film absorbs the shock, generally preventing any actual metal to metal impact, but if this should occur under some special condition the area of metal to withstand the impact is much higher, and much of the impact has been absorbed by the oil film. A quiet and durable drive for the reverse rotation inertia members is thereby provided by the disclosed structure, which simultaneously serves to create the motion which is free from harmonics.

It should be noted that by making the eccentric diameters 27 quite large in relation to their offset distance, an arrangement has been created in which these diameters overlap. This is made sufficient to allow a straight bore through the eccentric member 28, permitting a rigid crankpin 32 to pass directly through and be encompassed by both of the diameters 27 at the selected offset, to thereby allow support of the pin 32 from both ends in rigid manner, maintaining parallelism of the crankpin. This structure is thus seen to have additional merit in its ruggedness and rigidity.

In contriving arrangements for complete balancing, the motions and other characteristics of the mechanism which have been devised lend themselves very neatly to the needs, since for balancing consideration the total of the masses effective at the A, B and C points may be treated as one mass effective at C. It should be noted that the masses at A and B would be made equal since like parts are mounted thereon, making equal masses in effect at these centers. The total mass effective at point C is thereby that at A and B plus that directly effective at C, and is easily and simply balanced by a suitable mass effective at the diametrically opposed point W, which may be at a larger radius than C, so needing correspondingly less mass for balance. This reduced mass may then be divided into two parts, both being in line with point W in FIGURE 4, but being embodied as portions of the shafts 34 and 36 positioned in their counterweight portions 42. In FIGURE 5, the point W is on a vertical line with the points A, C, and B, and lies midway between the centers of mass of the counterweight portions 42. This vertical line corresponds with the plane of FIG. 4, in which the preceding balance conditions have been established. With this plane at right angles to the axis, dynamic balance conditions are also satisfied.

To complete the conditions under which full dynamic balance may be attained, the mass effective at point A in FIG. 5 is made up of a mass at point A1, and a smaller mass at A2 acting at a longer moment arm from point A. Any proportions would be fully effective if balanced mass-moments of A1 and A2 about point A are maintained. An equivalent condition obviously applies at point B. In FIG. 4 the points A1 and A2 coincide with the point A and the points B1 and B2 coincide with the point B, so these points follow the same motions as those of points A and B. The masses A2 and B2 may be embodied as masses forming the counterweight portions of the counterweighted flywheels 62 and made effective at points A2 and B2 in addition to the portions used purely for flywheel mass which are balanced about the center of the diameter 31 of these flywheels, thereby being directly effective at point C. The masses A1 and B1 are each equal to that of one of the piston and rod assemblies plus one of the eccentric diameter portions 27 and its adjacent walls.

The preceeding balance explanation has all referred to one quadrant of FIG. 4, but obviously the same type of motions are maintained through the four quadrants by alternate mirror image and identical conditions in the other quadrants. The masses B1 and B2 continuously balance the masses at A1 and A2 about the axis through point C, and mass-moments about point C as viewed in FIG. 5 are also balanced longitudinally by the equal mass-moments as explained, so a total mass is constantly maintained effective at point C through all quadrants and intervals therein, and is continuously maintained in dynamic balance by a suitable counterweight mass effective at the diametrically opposed point W.

It should be recognized that the disclosed drive structure has made it possible for the two straight line motions of the piston and rod assemblies, whose lines of action traverse and intersect the crank centerline, to operate without interference with the crankshaft even with all of these parts straddle supported, and further has made it possible for the geometry and construction to generate a positive and low backlash reverse drive without the use of gears, thereby providing a long life and quiet drive for the reverse rotation flywheel and counterweight masses without addition of any drive parts not necessary for other major objects. The ingenuity of this arrangement is further attested by the simple construction sufficing to attain full dynamic balance simultaneously with the other important objects. The reverse rotation flywheel mass may even be proportioned to balance and cancel all torque reactions on the mountings that are due to any speed changes caused by internal forces in the engine, such as piston forces when in idling operation. Such proportioning permits equalling the turbine in smoothness, while notably exceeding its performance in several other respects.

The four cylinder two cycle operation gives as many power pulses per revolution as the usual eight cylinder four cycle engine. Clean forced scavenging accompanied by inherently perfect balance permits significantly higher engine speed and proportionately increased number of power pulses per minute and per mile. Thereby this construction affords smoother and quieter operation than the best engines in common use today, even with very much simplified construction.

The disclosed structure may be adapted to provide full dynamic balance even in a single cylinder engine. This result is secured when three of the pistons and cylinders are removed, leaving one piston rod idle and reciprocable in its guides. This rod would then be proportioned to have the same total weight as the other rod plus the single piston remaining, instead of the same weight as the other rod alone, to preserve equal reciprocating masses. This leaves all the balance conditions fully amenable to balancing according to the description as has been given.

As will be evident to those skilled in the art, various other rearrangements of the elements of this invention may be made to adapt it to pumps, compressors, fluid motors driven by pressurized fluids and to four cycle engines or to pumps and engines of any number of cylinders, without need of inventive ingenuity, while retaining many of the main advantages. My invention should be recognized as embracing all modifications of the disclosed structure and its method of application which may fall within the scope of the claim.

I claim:

In a fluid displacement machine for compressible fluids, a crankcase, a crank space therein, a shaft rotatably mounted in said crank space, a cylinder on said crankcase with its axis transverse of the said shaft, a diaphragm positioned between said cylinder and said crankcase and separating said crank space from the space within the cylinder, a piston reciprocable in the said cylinder, a rod affixed to the said piston, a guide in the said diaphragm reciprocably supporting said rod and sealing thereagainst thereby completing a charge measuring chamber, means for interchanging reciprocating motion of said rod and rotary motion of said shaft, means for cyclicly timed exhaust from the said cylinder, a flat washer-shaped inlet valve seating on the cylinder side of the said diaphragm, an annular valve-space in said cylinder adjacent the said diaphragm and of a larger bore than the said cylinder, a generally conically formed spring with a plurality of annular corrugations and positioned between said valve and the opposite end of said valve-space to thereby seat the said valve, walls in the said crankcase forming a plurality of inlet passages isolated from said crank space, a plurality of apertures on the said diaphragm intermittently covered by the said valve, aligned ports in said crankcase connecting the said plurality of apertures with the said inlet passages, transfer ports in the said cylinder uncovered by the said piston as it approaches the said diaphragm, and walls in said cylinder to form a passage connecting said transfer ports with the said annular valve space and said charge measuring chamber.

References Cited by the Examiner

UNITED STATES PATENTS

| | | | |
|---|---|---|---|
| 1,056,746 | 3/1913 | Pitts | 123—56 |
| 1,386,965 | 8/1921 | Simpon | 123—74 |
| 1,886,190 | 11/1932 | Hodsdon | 137—516.15 X |
| 1,914,495 | 6/1933 | Ferguson | 137—516.23 |
| 2,033,810 | 3/1936 | Bernard | 123—32.2 |
| 2,223,100 | 11/1940 | Foster | 123—55 |
| 2,511,992 | 6/1950 | Quick | 123—191 X |
| 2,586,621 | 2/1952 | De Laage | 123—74 |
| 2,632,621 | 3/1953 | Gamble | 137—516.23 |
| 2,706,491 | 4/1955 | Kohler | 267—1 X |
| 2,758,897 | 8/1956 | Naab | 287—20 |
| 2,861,851 | 11/1958 | Young | 287—20 |
| 3,119,462 | 1/1964 | McMahan | 123—56 X |

FOREIGN PATENTS

| | | |
|---|---|---|
| 997,221 | 9/1951 | France. |

CARLTON R. CROYLE, *Acting Primary Examiner.*

WENDELL E. BURNS, MARK NEWMAN, *Examiners.*